United States Patent
Hochschild et al.

(10) Patent No.: US 7,634,642 B2
(45) Date of Patent: Dec. 15, 2009

(54) MECHANISM TO SAVE AND RESTORE CACHE AND TRANSLATION TRACE FOR FAST CONTEXT SWITCH

(75) Inventors: Peter H. Hochschild, New York, NY (US); Xiaowei Shen, Hopewell Junction, NY (US); Balaram Sinharoy, Poughkeepsie, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 11/481,515

(22) Filed: Jul. 6, 2006

(65) Prior Publication Data

US 2008/0010442 A1    Jan. 10, 2008

(51) Int. Cl.
*G06F 9/00* (2006.01)
*G06F 9/46* (2006.01)

(52) U.S. Cl. ...................................... 712/228; 718/108
(58) Field of Classification Search ................. 712/228; 711/206, 207; 718/108
See application file for complete search history.

(56) References Cited

U.S. PATENT DOCUMENTS

| | | | |
|---|---|---|---|
| 5,727,211 A | 3/1998 | Gulsen | |
| 6,061,711 A | 5/2000 | Song et al. | |
| 6,314,510 B1 | 11/2001 | Saulsbury et al. | |
| 6,510,508 B1 | 1/2003 | Zuraski, Jr. et al. | |
| 7,146,489 B2 * | 12/2006 | Dowling | 712/207 |
| 2005/0216709 A1 * | 9/2005 | Tamai | 712/228 |

* cited by examiner

*Primary Examiner*—Eddie P Chan
*Assistant Examiner*—William B Partridge
(74) *Attorney, Agent, or Firm*—Scully, Scott, Murphy & Presser, P.C.

(57) ABSTRACT

A method and system for efficient context switching are provided. An execution entity that is to be context switched out is allowed to continue executing for a predetermined period of time before being context switched out. During the predetermined period of time in which the execution entity continues to execute, the hardware or an operating system tracks and records its footprint such as the addresses and page and segment table entries and the like accessed by the continued execution. When the execution entity is being context switched back in, its page and segment table and cache states are reloaded for use in its immediate execution.

21 Claims, 2 Drawing Sheets

MECHANISM TO SAVE AND RESTORE CACHE AND TRANSLATION TRACE FOR FAST CONTEXT SWITCH

STATEMENT REGARDING FEDERALLY SPONSORED RESEARCH OR DEVELOPMENT

This invention was made with Government support under Contract No.: NBCH020056 (DARPA) awarded by Defense, Advanced Research Projects Agency. The Government has certain rights in this invention.

FIELD OF THE INVENTION

The present disclosure generally relates to computer processing, and particularly to context switches and memory management.

BACKGROUND OF THE INVENTION

A context switch generally refers to the switching of the CPU (central processing unit) from one process or thread to another. A process or thread is, for example, an execution instance of a program or stream of instructions. A context describes an executing environment of a process or thread such as the virtual address space and state that is in the CPU's registers caches, including Translation Lookaside Buffers (TLBs), etc., program counter, and other execution state information, at any point in time. A context switch involves storing and restoring the state of a CPU such that multiple processes can share a single CPU resource. Modern processors may have multiple cores per CPU and multiple threads per core; for convenience in this patent application, CPU is used to refer to the hardware entities needed to execute a single instruction stream including cache, Translation Lookaside Buffer (TLB), registers, functional units etc. In a context switch, the state of the first process must be saved, so that when the CPU gets back to the execution of the first process, it can restore this state and continue. Generally, the state of the process includes all the registers that the process may be using such as the program counter and any other data that may be necessary.

Context switching generally involves suspending the progression of one process and storing the CPU's state for that process somewhere in memory, retrieving the context of the next process from memory and restoring it in the CPU's registers and returning to the location indicated by the program counter (i.e., returning to the line of code at which the process was interrupted) in order to resume the process.

Context switching requires considerable processor time, and incurs a substantial cost to the system, for instance, in terms of CPU time. Several primary factors contribute to the cost of a context switch: for one, registers and associated states must be saved when the process is switched out; for another, registers and associated states must be restored when the process is switched in; thirdly, registers and associated states associated with different caches such as the TLB, Segment Lookaside Buffer (SLB) and memory instruction and data cache is lost and must be re-created as misses occur. The costs incurred for first and second factors mentioned above are generally being offset by faster processors. The third factor, however, that involves the cache "footprint" which takes significant time to reload, has been greatly impacted by the widening speed gap between the processor and the memory. Further, because the misses to re-create the TLB; SLB, or instruction (I) and data (D) cache state stall the processor, it is particularly detrimental to processing performance. It is expected-that the performance impact on context switches, for instance, because of the process of reloading the cache "footprint", will continue to increase and worsen as processor speed improvements out pace memory speed improvements.

Known techniques have focused on decreasing the amount of register states that need to be saved and restored across context switches. While such techniques help to reduce the cost of a context switch, it does not address the most expensive part of the context switch, that is, restoring the footprint. Accordingly, a method that would reduce the overhead impact in context switching of having to re-create different caches is desirable.

BRIEF SUMMARY OF THE INVENTION

A method and system for efficient context switching are provided. A method in one aspect includes allowing an execution entity in a processor to continue executing for a predetermined period of time, in response to determining that the execution entity is to be context switched out. The method also includes tracking cache (for example, TLB, SLB, etc.) access pattern of the execution entity during the predetermined period of time in which the execution entity continues to execute. The method further includes saving information associated with the tracked cache access pattern and context switching out the execution entity. In one aspect, the information associated with the tracked cache access pattern may include at least one of addresses, page table entries, segment table entries, address misses for instruction cache, and address misses for data cache.

A method for efficient context switching in another aspect includes context switching in an execution entity that was context switched out previously, and accessing from memory information associated with execution entity's cache access pattern tracked prior to the execution entity being context switched out. The method in another aspect also includes restoring execution entity's footprint from the information. In one aspect, the footprint may include at least one of TLB state, SLB state, instruction-cache state, and data-cache state. In another aspect, the step of restoring may include selectively restoring execution entity's footprint based on a priori knowledge of one or more of past and expected performance of the execution entity.

A system for efficient context switching in one aspect includes a memory and a processor operable to allow an execution entity in the processor to continue executing for a predetermined period of time, in response to determining that the execution entity is to be context switched out. The processor is further operable to track cache access pattern of the execution entity during the predetermined period of time in which the execution entity continues to execute. The processor is also operable to save information associated with the tracked cache access pattern in the memory, and to context switch out the execution entity. In one aspect, the information associated with the tracked cache access pattern may include at least one of addresses, page table entries, segment table entries, address misses for instruction cache, and address misses for data cache.

A system for efficient context switching in another aspect includes a memory and a processor operable to context switch in an execution entity that was context switched out previously. The processor is further operable to access from the memory information associated with execution entity's cache access pattern tracked prior to the execution entity being context switched out, and to restore execution entity's footprint from the information. In one aspect, the footprint may include at least one of TLB state, SLB state, instruction-cache state, and data-cache state.

Further features as well as the structure and operation of various embodiments are described in detail below with reference to the accompanying drawings. In the drawings, like reference numbers indicate identical or functionally similar elements.

DETAILED DESCRIPTION

Figure 1:
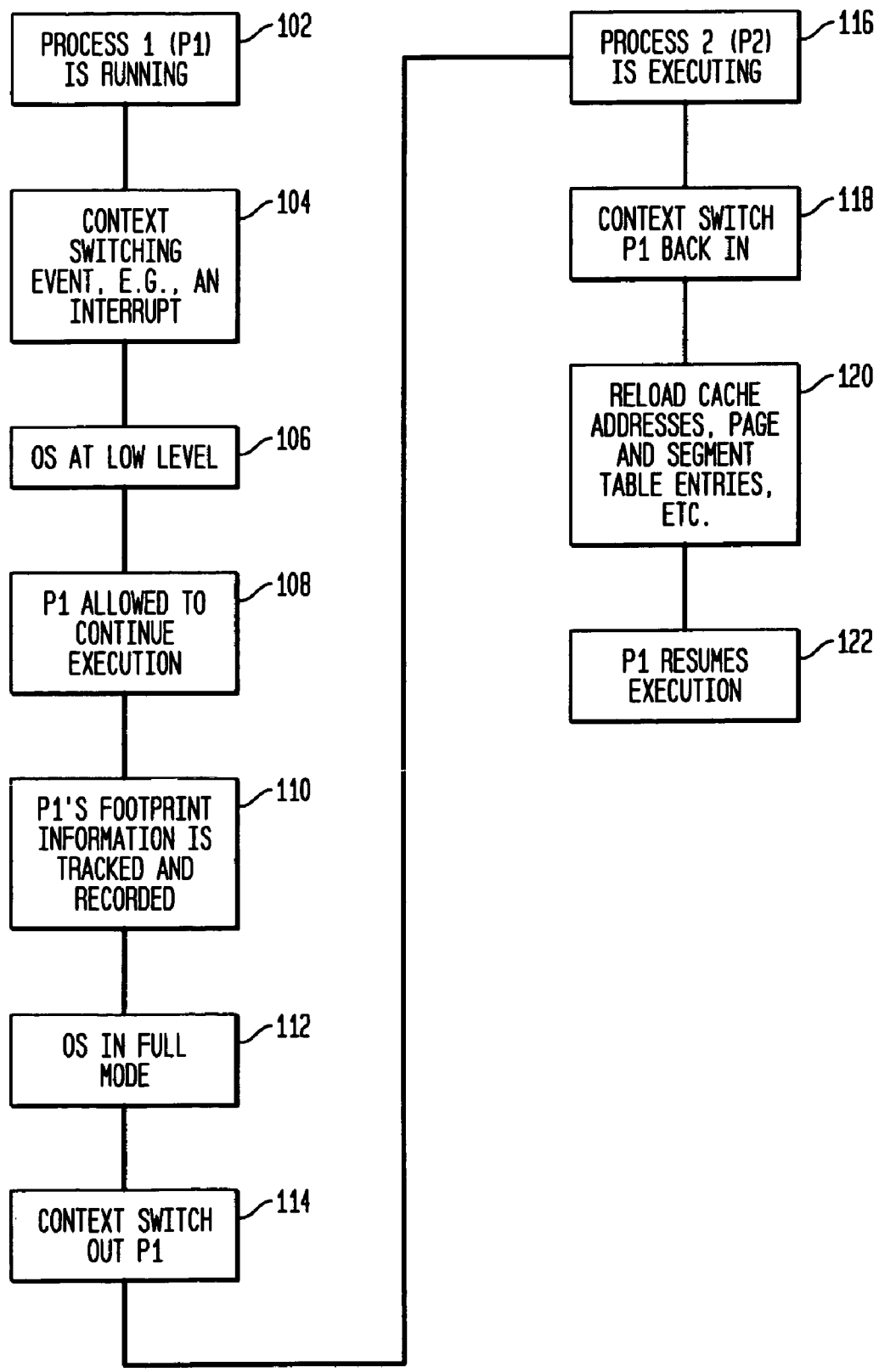
FIG. 1 is a flow diagram illustrating a method of the present disclosure in one embodiment.

FIG. 1 is a flow diagram illustrating a method of the present disclosure in one embodiment. In this example, the method is described with reference to running processes. However, it should be understood that the method equally applies to threads and any other executing entities. In addition, in the following description, the terms processes, threads, and tasks are used interchangeable to refer to an entity executing on a processor, for instance, the CPU. At 102, the CPU is running process 1. At 104, an event occurs that requires switching process 1 out of the CPU so that another process, for instance, process 2, can run. This may happen, for instance, in a multitasking operating system where a scheduler allows every task to run for certain amount of time or a timer interrupt fires so that the operating system can schedule another process for execution. Another example scenario where a running process may be switched out is when an interrupt is issued and the CPU is needed to handle the interrupt. At 106, an operating system runs at a low level, determining for example, whether an interrupt that came in would require context switching the current process.

At 108, the operating system issues instructions to the hardware components of the CPU notifying that the currently running process, process 1, is to be switched out. In an exemplary embodiment of the present disclosure, the operating system provides instructions to the hardware so that the hardware, rather then immediately performing the steps for context switching, allows process 1 to continue executing. The hardware may allow process 1 to continue executing, for instance, for a predetermined number of cycles such as 100 cycles. The process continues the execution preferably without side effects and without waiting stalling for TLB, SLB, or cache misses. That is, during this discovery process, no process-visible state is altered. For instance, memory stores or other executions that change permanent states are not performed. Rather, a speculative execution is conducted.

During this speculative execution, at 110, the hardware tracks and records all data and instruction references, for example, including the addresses and page and segment table entries accessed by process 1 while continuing its execution. Conventional or will-be-known branch prediction algorithms may be employed to predict the execution path when a branching instruction is encountered during this continued execution. In one embodiment, data misses or misses to other resources are recorded, but not resolved during this discovery execution. The information may be stored, for example, in a well-known position in memory where the operating system may access it. This stored information provides a reasonable representation of the current state of the cache for this process.

At 112, the operating system enters normal mode. At 114, a context switch occurs. For example, the register and program states of process 1 are saved at the point when the context switch should have occurred, that is, before the continued speculative execution, and process 2 is brought in to execute. At 116, process 2 runs. At some point in the execution, process 1 needs to be switched back in. This may happen, for example, if process 2 has used up its allocated time with the CPU or if process 2 was handling an interrupt and has finished its execution. At 118, process 1 is context switched back in. That is, the stale of the CPU when it was context switched out is restored, including its register and program counter states. In addition, at 120, the hardware or the operating system issues a series of instructions that causes the saved footprint, i.e., the information about the addresses and page and segment table entries and the like observed and recorded during the continued execution before process 1 was context switched out, to be reloaded. This is the footprint state that will be needed by the process as it executes after being context switched back in.

In one aspect, all of the state is loaded with the latency of the separate misses overlapped. For instance, rather than processing the misses in order as may be the case in normal program execution, the misses recorded during the discovery execution may be resolved together. The misses may be fetched in sequential instructions and the results received in parallel. Because the resolution of misses (for example, of data and instruction, etc.) incurs high latency, there is a significant advantage in resolving the misses concurrently. Thus, the time to recreate the state is significantly reduced. At 122, process 1 resumes its execution. By having the footprint state available and resolving misses in parallel, the disclosed method in one aspect allows a process to execute efficiently immediately after the context switch.

In one embodiment, if it is a hardware thread that is being context switched, an operating system need only indicate that the new thread has been switched back in. The misses encountered during the discovery execution may be recorded in memory associated with the process that is swapped-out or context switched out. Upon swap-in (context switch in), the hardware may access the memory and resolve the missed record.

Figure 2:
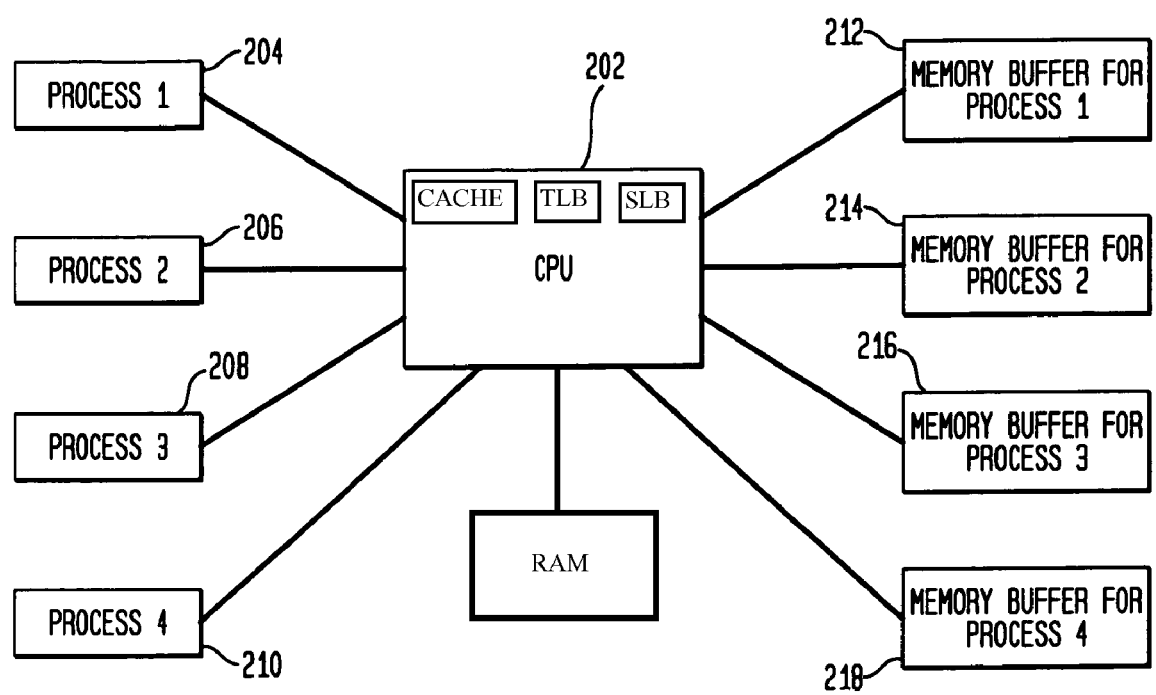
FIG. 2 is a block diagram illustrating the method of the present disclosure in one embodiment.

FIG. 2 is a block diagram illustrating the processing components of the present disclosure in one embodiment. A processor, for instance, a central processor unit 202 (CPU) generally contains the hardware components for processing instructions and data, and implements the various data processing tasks of a computer. The CPU 202, for example, can be designed and constructed by combining various digital functions, such as registers, ALU (arithmatic logic unit), multiplexers, and decoders. It may be a microprocessor enclosed in one integrated circuit (IC) package functioning as a CPU for a general purpose computer and/or as a processor unit in a special-purpose dedicated systems. The CPU 202 executes the execution entities 204, 206, 208, 210, switching context as the execution entities get their share of the CPU 202. Execution entites 204, 206, 208, 210 may include processes, threads, or any other entities that may execute in the CPU, or the like. Further, the execution entities 204, 206, 208, 210 may be a hardware thread, a process managed by an operating system, a thread managed by an operating, or the like.

In an exemplary embodiment of the present disclosure, when the CPU 202 determines that the currently executing entity, for example, process 1 204 is to be context switched out, for instance, for process 2 206 to execute, the CPU 202 allows process 1 204 to continue executing for a predetermined period of cycles rather than preparing for the context switch immediately. During this predetermined period of cycles that process 1 204 is continuing to run, the CPU 202 tracks and records information related to process 1's cache footprint. Such information may include but is not limited to address misses for the instruction cache, address misses for the data cache, page table entries, segment table entries, or the like. Those information, for instance, make up the states of TLB, SLB, instruction-cache, and data-cache. This is the footprint state that process 1 may need as it executes the first several hundred instructions after being context switched back in. In one embodiment, the information is saved in a memory location, for instance, allocated for process 1 212. Preferably, the memory buffers 212, 214, 216, 218 that store process's footprint are located close to or on the CPU. After the predetermined period of cycles that process 1 is allowed to continue running, the CPU 202 context switches out process 1, and brings process 2 in for execution. When it is time for process 2 to be switched out for another process, the CPU 202 performs the similar procedure for process 2 of saving its footprint information to its allocated memory buffer at 214.

When the CPU 202, for instance, via instructions from an operating system or hardware, is context switching process 1 204 back in, the memory buffer 212 having process 1's saved footprint information such as page and segment table entries and cache states is accessed and the information is reloaded, for example, by a series of instructions. The information is used, for example, to reload process 1's TLB state, SLB state, instruction-cache state, data-cache state, and the like. Process 1 204 may then continue to execute efficiently immediately after being context switched back in.

In one embodiment of the present disclosure, an operating system or the like may decide which information from the saved footprint information or whether the information is to be reloaded when a process is being context switched back in. The operating system or the like may make such decisions based on its knowledge of the access patterns of the particular process being context switched back in or its performance. Thus, in one embodiment, not all the saved information need to be restored. Rather, an operating system or the like may perform selective restoration based on the past and/or expected access pattern or performance of a process.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for context switching, comprising:
    allowing an execution entity in a processor to continue executing for a predetermined period of time, in response to determining that the execution entity is to be context switched out;
    tracking a cache access pattern of the execution entity during the predetermined period of time in which the execution entity continues to execute;
    saving information associated with the tracked cache access pattern; and
    switching out the execution entity after allowing the execution entity to continue executing for the predetermined period of time, said switching occurring at an execution point before the continued execution by saving states of said execution point.

2. The method of claim 1, wherein the information associated with the tracked cache access pattern includes at least one of addresses, page table entries, segment table entries, address misses for instruction cache, and address misses for data cache.

3. The method of claim 1, wherein the tracking cache access pattern includes tracking an execution entity's access to a translation lookaside buffer (TLB), access to a segment lookaside Buffer (SLB), access to a cache memory, or combination thereof.

4. The method of claim 1, wherein the predetermined period of time is a predetermined number of cycles.

5. The method of claim 1, wherein the saving information includes saving information associated with the tracked cache access pattern in a memory.

6. The method of claim 1, wherein the saving information includes saving information associated with the tracked cache access pattern in a random access memory positioned on the processor.

7. The method of claim 1, wherein the execution entity includes at least one of a hardware thread, a process managed by an operating system, a thread managed by an operating system.

8. The method of claim 1, further including:
    context switching in the execution entity;
    loading the saved information; and
    issuing one or more instructions to restore an execution entity's footprint.

9. The method of claim 8, wherein the footprint includes at least one of a translation lookaside buffer (TLB) state, a segment lookaside buffer (SLB) state, an instruction-cache state, and a data-cache state.

10. The method of claim 8, wherein the step of issuing one or more instructions includes issuing one or more instructions to selectively restore an execution entity's footprint based on at least one of past and expected performances of the execution entity.

11. A method for context switching, comprising:
    allowing an execution entity in a processor to continue executing for a predetermined period of time, in response to determining that the execution entity is to be context switched out;
    tracking a cache access pattern of the execution entity during the predetermined period of time in which the execution entity continues to execute;
    saving information associated with the tracked cache access pattern;
    switching out the execution entity after allowing the execution entity to continue executing for the predetermined period of time, said switching occurring at an execution point before the continued execution by saving states of said execution point;
    context switching in the execution entity that was switched out previously;
    accessing from memory the information associated with an execution entity's cache access pattern tracked prior to the execution entity being switched out; and
    restoring an execution entity's footprint from the information, said footprint including at least information that will be needed by the execution entity as it executes a first predetermined number of instructions after being context switched back in.

12. The method of claim 11, wherein the footprint includes at least one of a translation lookaside buffer (TLB) state, a segment lookaside buffer (SLB) state, an instruction-cache state, and a data-cache state.

13. The method of claim 11, wherein the step of restoring includes selectively restoring the execution entity's footprint based on a priori knowledge of one or more of past and expected performance of the execution entity.

14. The method of claim 11, wherein the information includes at least one of addresses, page table entries, segment table entries, address misses for instruction cache, and address misses for data cache.

15. The method of claim 11, wherein the memory is connected to a processor running the execution entity.

16. The method of claim 11, wherein the memory is positioned on a processor running the execution entity.

17. The method of claim 11, wherein said footprint further having cache misses observed during the continued execution for the predetermined period of time, said cache misses being resolved in parallel.

18. A context switching system, comprising:
    a memory; and
    a processor operable to allow an execution entity in the processor to continue executing for a predetermined period of time, in response to determining that the execution entity is to be context switched out, the processor further operable to track cache access pattern of the execution entity during the predetermined period of time in which the execution entity continues to execute, the processor further operable to save information associated with the tracked cache access pattern in the memory, and to context switch out the execution entity after allowing the execution entity to continue executing for the predetermined period of time, said context switch occurring at an execution point before the continued execution.

19. The system of claim 18, wherein the information associated with the tracked cache access pattern includes at least one of addresses, page table entries, segment table entries, address misses for instruction cache, and address misses for data cache.

20. The system of claim 18, wherein the processor is further operable to context switch in an execution entity that was context switched out previously, the processor further operable to access from the memory information associated with execution entity's cache access pattern tracked prior to the execution entity being context switched out, and to restore execution entity's footprint from the information, said cache access pattern including at least cache access pattern of the execution entity obtained from a continued execution of the execution entity past a point of the context switch.

21. The system of claim 20, wherein the footprint includes at least one of TLB state, SLB state, instruction-cache state, and data-cache state.

* * * * *